P. HUTCHINS.
Truck.
No. 12,251. Patented Jan. 16, 1855.
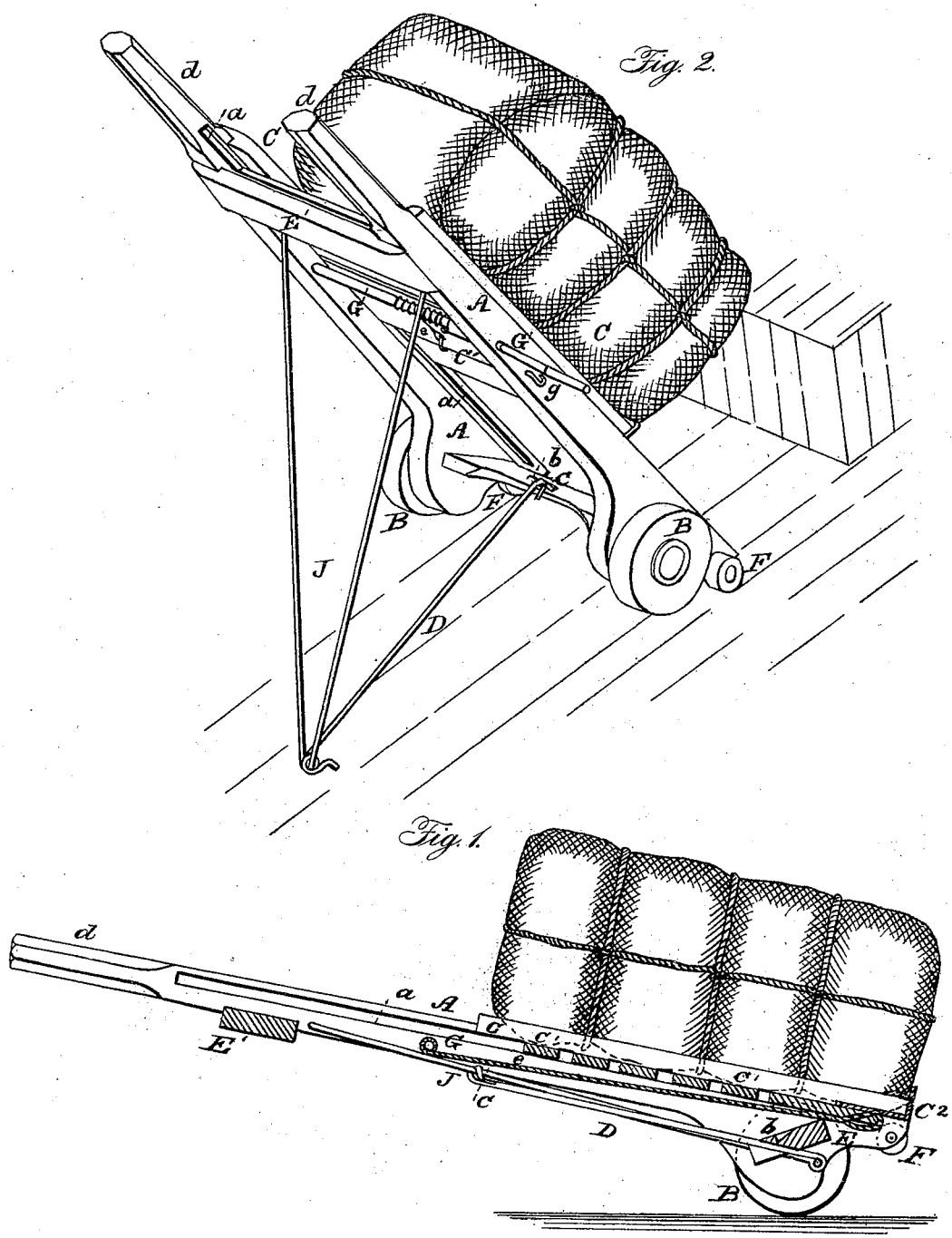

UNITED STATES PATENT OFFICE.

PARLEY HUTCHINS, OF NORWICH, MASSACHUSETTS.

HAND-TRUCK.

Specification of Letters Patent No. 12,251, dated January 16, 1855.

*To all whom it may concern:*

Be it known that I, PARLEY HUTCHINS, of Norwich, in the county of Hampshire and State of Massachusetts, have invented a new and useful Improvement in Hand-Trucks; and I do hereby declare that the following is a full, clear, and exact description of the same, reference being had to the accompanying drawings, forming part of this specification, in which—

Figure 1, is a longitudinal sectional view of the truck in condition for moving a load from one place to another, and Fig. 2, is a perspective view of the same in condition for elevating the load.

Similar letters of reference indicate corresponding parts in both figures.

This invention consists in furnishing the truck with an elevator of which the front piece which raises and supports the load forms a part, the said elevator working in suitable guides in the side pieces of the truck and being connected with a windlass carried by the truck, for the purpose of raising the load to deposit upon a cart or any place elevated a considerable height above the ground.

A, A, are the side pieces of the truck of which the handles $d$, $d$, form a part. These are united by cross pieces E, E′; and furnished with a pair of wheels B, B.

Thus far my truck resembles the common hand truck without a front piece. The elevator consists of a strong frame composed of side pieces C, C, and cross pieces C′, C′, and having attached to its front the iron front piece $C^2$, such as is attached to the side pieces A, A, of the common hand truck. This frame rests on the top of the side pieces A, A, and is furnished with tongues on its sides to fit in grooves $a$, $a$, in the said side pieces A, A, so that it is confined to the main portion of the truck but free to slide up and down.

G, is the windlass shaft or barrel working in bearings in the side pieces A, A, outside of which it is provided at one end with a crank G′. The elevator is attached to this windlass by a cord $e$.

J, is a leg attached to the back or under side of the side pieces A, A, to support the truck while raising the load upon it by the elevator. This leg, when in use, is braced by a brace D, at the bottom which hooks with a hook $c$, into a notch $b$, in the cross piece E as shown in Fig. 2; but when not in use, the brace hooks onto one side of it, and it is thrown up close to the underside of the truck. The truck is provided with a pair of small wheels F, F, in front of the wheels B, B, for the purpose of raising the truck with its load onto a pair of scales to be weighed, or raising it up a step. These wheels however are not new.

The load is brought onto this truck in the same way as on a common truck, the elevator being for that purpose let down to its lowest position in order that the front piece $C^2$, may be got under the load, and the leg J, is thrown up close to the under side. The elevator remains in this position while the load is being moved, as shown in Fig. 1, but when the load is to be lifted it is brought close to where it is to be deposited, and the handles are then raised to throw the weight on the small wheels F, F. The leg J, is thrown down onto the ground or floor and the brace D, brought into operation, when the truck will stand firm by itself and leave the person using it, at liberty to turn the crank G, of the windlass to wind up the cord $e$, and raise the elevator with the load upon it as shown in Fig. 2. The crank is then prevented turning by a pin $g$, inserted in the side piece as a stop; and the load is deposited on the cart, shelf, or other elevated place, by merely bringing forward the handles of the truck and dumping it off the truck.

What I claim as my invention and desire to secure by Letters Patent, is—

The elevator constructed, and combined with a hand truck, substantially as herein described, whether operated by a windlass or any other device commonly employed for raising weights.

PARLEY HUTCHINS.

Witnesses:
DANIEL GRANGER,
WILLIAM TUSCH.